United States Patent [19]

Gotoh et al.

[11] Patent Number: 4,646,950

[45] Date of Patent: Mar. 3, 1987

[54] SLIDING NOZZLE PLATE

[75] Inventors: Michihiro Gotoh; Tsuyoshi Fujimoto, both of Takasagoshi; Nobiru Komatsu; Yuzo Otsuki, both of Tokaishi, all of Japan

[73] Assignees: Harima Refractory Co., Ltd., Hyogoken; Nippon Steel Corporation, Tokyo, both of Japan

[21] Appl. No.: 665,434

[22] Filed: Oct. 26, 1984

[30] Foreign Application Priority Data

Oct. 29, 1983 [JP] Japan ................................. 58-201912

[51] Int. Cl.$^4$ ........................ B22D 41/08; C04B 35/10
[52] U.S. Cl. ..................................... 222/591; 501/97; 501/105
[58] Field of Search ........................ 222/600, 591, 561; 501/105, 88, 89, 92, 97, 98, 99, 96; 75/233; 419/19, 11

[56] References Cited

U.S. PATENT DOCUMENTS

| | | | |
|---|---|---|---|
| 3,526,485 | 9/1970 | Dawihl et al. | 419/19 |
| 4,179,046 | 12/1979 | Jeschke et al. | 222/600 |
| 4,298,385 | 11/1981 | Claussen et al. | 501/154 |
| 4,326,040 | 4/1982 | Kaji et al. | 501/105 |
| 4,366,254 | 12/1982 | Rich et al. | 501/96 |
| 4,396,724 | 8/1983 | Burden | 501/98 |

FOREIGN PATENT DOCUMENTS

| | | | |
|---|---|---|---|
| 0027968 | 2/1982 | Japan | 222/600 |
| 0027971 | 2/1982 | Japan | 222/600 |
| 0779353 | 11/1980 | U.S.S.R. | 501/89 |

*Primary Examiner*—H. Grant Skaggs
*Assistant Examiner*—Nils Pedersen
*Attorney, Agent, or Firm*—Wenderoth, Lind & Ponack

[57] ABSTRACT

A sliding nozzle plate enjoying outstanding stability to resist wear, spalling, corrosion, and particularly loss due to corrosion is produced by preparing a composition consisting of at least one refractory raw material selected from the group consisting of acidic and/or neutral refractory raw materials, carbon, metal powder, and 2 to 50% by weight, based on the total weight of the composition, of coarse and/or medium particles of an alumina-zirconia-titania mixture of 42 to 79.3% by weight of alumina, 20 to 40% by weight of zirconia, 0.5 to 16% by weight of titania, and the balance to make up 100% by weight and not more than 2% by weight of inevitably entrained elements. The composition is required to have a particle size distribution of 30 to 60% by weight of coarse and medium particles and the balance to make up 100% by weight of fine particles and/or fine powder. The composition is kneaded with a binder, molded in a prescribed shape, and subjected to firing in reducing atmosphere.

8 Claims, 5 Drawing Figures

Fig. 1 (×90)
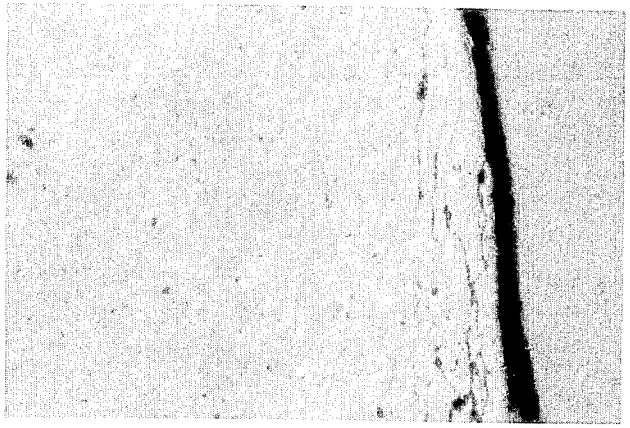
Fig. 4 (×15)
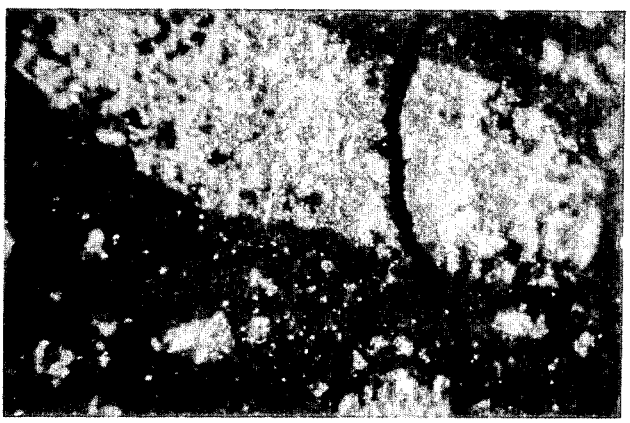
Fig. 5 (×15)
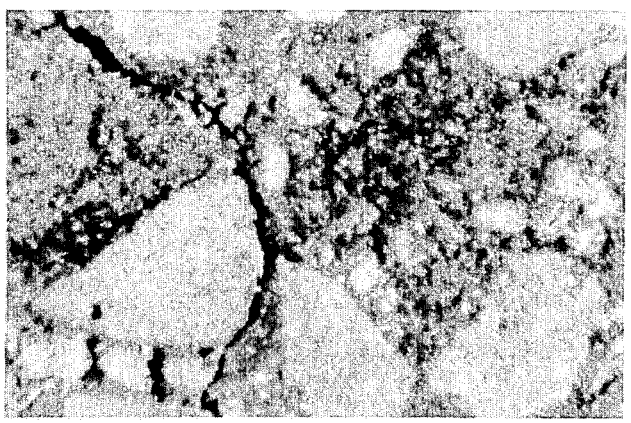

SLIDING NOZZLE PLATE

BACKGROUND OF THE INVENTION

1. Field of the Invention

This invention relates to a sliding nozzle plate (hereinafter referred to as "SN plate") to be used as a refractory member for a sliding nozzle unit attached to a molten steel vessel such as a ladle or tundish.

2. Description of the Prior Art

The SN plate functions to control the flow volume of molten steel and, therefore, is required to possess highly exacting properties. The SN plate, for example, is destined to expose itself to physical actions such as abrasion by molten steel flow, violent thermal shock, and abrasion by friction and to chemical corrosion as by contact with molten steel or molten slag. Thus, it is required to possess resistance to wear, resistance to spalling, resistance to corrosion, etc.

Various materials have been developed for the SN plate. At present, materials having alumina as a principal constituent find popular acceptance. Generally, these materials are impregnated with tar or pitch for the purpose of lengthening service life. They, however, have a disadvantage in that the tar or pitch contained therein emits considerable amounts of smoke thus pollating the environment and fouling the sliding nozzle unit as a whole. Thus, a materials incapable of emitting smoke, alumina-carbon type materials, alumina-mullite-carbon type materials additionally incorporating such natural raw materials as sillimanite and andalusite and such synthetic raw materials as mullite and mullite-zirconia for the purpose of lowering thermal expansion coefficient, and alumina-mullite-zirconia-carbon materials have found growing acceptance. While these materials are fairly satisfactory in terms of resistance to corrosion, they still suffer from problems peculiar to the SN plate such as chipping of the edge portion of nozzle orifice due to violet thermal shock and peeling of the sliding surface.

In recent years, production of special steel alloys such as calcium-added steel, high-manganese steel, and weakly deoxidized steel of high oxygen content has been increasing. When the SN plate made of any of the materials described above is used in the production of such special steel alloy, therefore, the wear of the SN plate by corrosion owing to the action of calcium, manganese, and oxygen contained in the steel becomes quite conspicuous. This is because the silica, one of the mineral constituents present in the texture of the SN plate reacts with calcium and manganese in the steel and gives rise to a low melting substance.

OBJECT OF THE INVENTION

An object of this invention is to provide an SN plate which substantially eliminates the drawbacks found in conventionl SN plates such as chipping of the edge portion of the nozzle orifice due to violent thermal shock and peeling of the sliding surface and which excels in resistance to wear, resistance to spalling, resistance to corrosion, and particularly resistance to wear of the nozzle orifice by corrosion.

The other objects and characteristic features of this invention will become apparent to those skilled in the art as the disclosure is further made in the following description of a preferred embodiment of the invention, as illustrated in the accompanying drawings.

BRIEF DESCRIPTION OF THE DRAWINGS

FIG. 1 is a photomicrograph ($\times 90$) of an alumina-zirconia-titania mixture.

FIG. 4 is a photomicrograph ($\times 15$) of the surface of breakage by cracking in the SN plate of Comparative Experiment 1.

FIG. 5 is a photomicrograph ($\times 15$) of the surface of breakage by cracking in the SN plate of Example 2 of the present invention.

DETAILED DESCRIPTION OF THE INVENTION

Figure 2:
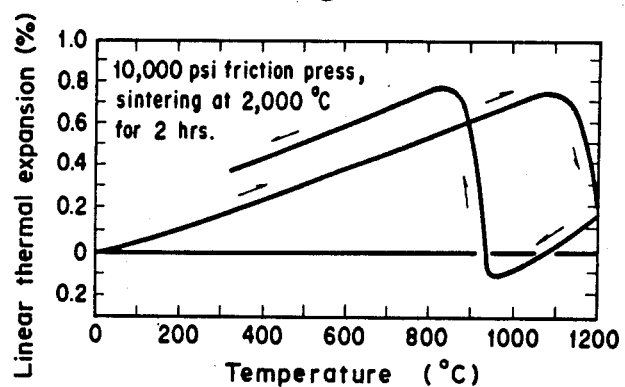
FIG. 2 is a graph showing the transformation by thermal expansion of a monoclinic zirconia.

This invention, in its first aspect, resides in a sliding nozzle plate, produced by preparing a composition consisting of at least one refractory raw material selected from the group of acidic and/or neutral refractory raw materials, carbon, metal powder, and 2 to 50% by weight, based on the total weight of the composition, of coarse and/or medium particles of an alumina-zirconia-titania mixture of 42 to 79.3% by weight of alumina, 20 to 40% by weight of zirconia, 0.5 to 16% by weight of titania, and the balance to make up 100% by weight and not more than 2% by weight of inevitably entrained elements, the composition having a particle size distribution of 30 to 60% by weight of coarse and medium particles and the balance to make up 100% by weight of fine particles and/or fine powder, kneading the composition with a binder, molding the resultant mixture in a prescribed shape, and thereafter subjecting the molded body to firing in a reducing atmosphere.

This invention in its second aspect resides in a sliding nozzle plate, produced by preparing a composition consisting of at least one refractory selected from the group consisting of acidic and/or neutral refractories, carbon, metal powder, at least one member selected from the group consisting of monoclinic zirconia of not more than 20 $\mu$m in particle size and silicon carbide and silicon nitride both not more than 150 $\mu$m in particle size, and 2 to 50% by weight, based on the total weight of the composition, of coarse and/or medium particles of an alumina-zirconia-titania mixture of 42 to 79.3% by weight of alumina, 20 to 40% by weight of zirconia, 0.5 t 16% by weight of titania, and the balance to make up 100% by weight and not more than 2% by weight of inevitably entrained elements, the composition having a particle size distribution of 30 to 60% by weight of coarse and medium particles and the balance to make up 100% by weight of fine particles and/or fine powder, kneading the composition with a binder, molding the resultant mixture in a prescribed shape, and thereafter subjecting the molded body to firing in a reducing atmosphere.

Now, the present invention will be described in detail below. As the conventional SN plates, the SN plates of alumina-carbon material, alumina-mullite-carbon material, and alumina-mullite-zirconia-carbon material are considered here. Of these SN plates which have exhibited, those particularly sustaining chipping of the edge portion of the nozzle orifice and those sustaining peeling of the sliding surface have been selected and their fractured surfaces have been closely observed. It has been consequently ascertained that coarse particles and medium particles present in the fractured surfaces of textures have sustained internal fracture of their particles and given rise to linear paths for propagation of cracks.

As factors which govern this internal fracture of coarse and medium particles, there may be cited the matrix strength and grain boundary strength within the texture of the SN plate and the strength of coarse and medium particles themselves. Generally, the SN plate is manufactured by mixing a composition as the starting material with a binder, molding the resultant mixture in a prescribed shape, firing the molded body, and impregnating it with tar, pitch, or resin for enhancement of strength. As concerns the texture of the finished SN plate, it is in the matrix part rich in open pores that the tar, pitch, or resin penetrates into the SN plate. The increase of strength by the impregnation of tar, pitch, or resin is limited to the matrix and the grain boundary of coarse and medium grains. When thermal stress exceeding the strength of the SN plate develops and, consequently, cracks grow in the matrix, the coarse and medium particles which are deficient in strength readily yield to fracture. This fracture is propagated in linear paths, resulting is chipping of the edge portion of the nozzle orifice and peeling of the sliding surface.

The alumina-zirconia-titania mixture which is one of the components of the composition used in the SN plate of this invetion has a high strength such that even when a crack occurs in the matrix of the texture of this SN plate, the crack propagates along a zigzag path detouring the coarse and medium alumina-zirconia-titania particles. Thus, the SN plate of this invention is precluded from layer separation due to cracking, chipping of the edge portion of the nozzle orifice, or peeling of the sliding surface. The aforementioned high strenth manifests an outstanding effect in protecting the nozzle orifice against corrosion and the sliding surface against wear. All these effects work synergistically to enhance the service life of the SN plate to a great extent.

As shown in FIG. 1, the alumina-zirconia-titania mixture has a crystalline structure wherein zirconia and titania are dispersed among corundum crystals developed after the pattern of dendrite.

The zirconia in the mixture is preponderantly monoclinic zirconia. When alumina, zirconia and titania are fused and quenched in the course of the manufacture of the particles of alumina-zirconia-titania mixture, the crystalline structure of zirconia partially remains in a tetragonal form owing to the presence of titania in the mixture. Since the surviving tetragonal zirconia possesses internal energy, the produced particles acquires notably improved resistance to fragmentation.

Further, alumina, zirconia and titania are fused and quenched in the course of manufacture of the particles, the corundum crystals consequently separated in the mixture are small and grow dendritically.

If the titania ($TiO_2$) content is less than 0.5% by weight, the amount of the tetragonal zirconia to be produced is not sufficient. If this content exceeds 16% by weight, the excess zirconia goes to form zirconium titanate ($ZrTiO_4$) which impairs the strength of particles.

If the zirconia content is less than 20% by weight and alumina content exceeds 79.3% by weight, the corundum crystal size becomes larger and growth of dendritic crystals is repressed, because zirconia is insufficiently distributed around the corundum crystals at separation. Thus, the particles lose strength. If the zirconia content exceeds 40% by weight and the alumina content is less than 42% by weight, the volume change characteristic of the monoclinic cirzonia increases to the extent of causing a crack within the particles and lowering the particle strength. The alumina content decreases with the decreasing resistance to corrosion.

The alumina-zirconia-titania mixture is suitable for manufacture of electrofused products and sintered products when its chemical composition falls in the range specified above. Because of the formation of the tetragonal zirconia, however, this mixture is more suitable for the manufacture of electrofused products than for sintered products.

The SN plate suffers from loss of strength and resistance to corrosion when the content of inevitably entrained substances exceeds 2% by weight.

Figure 3:
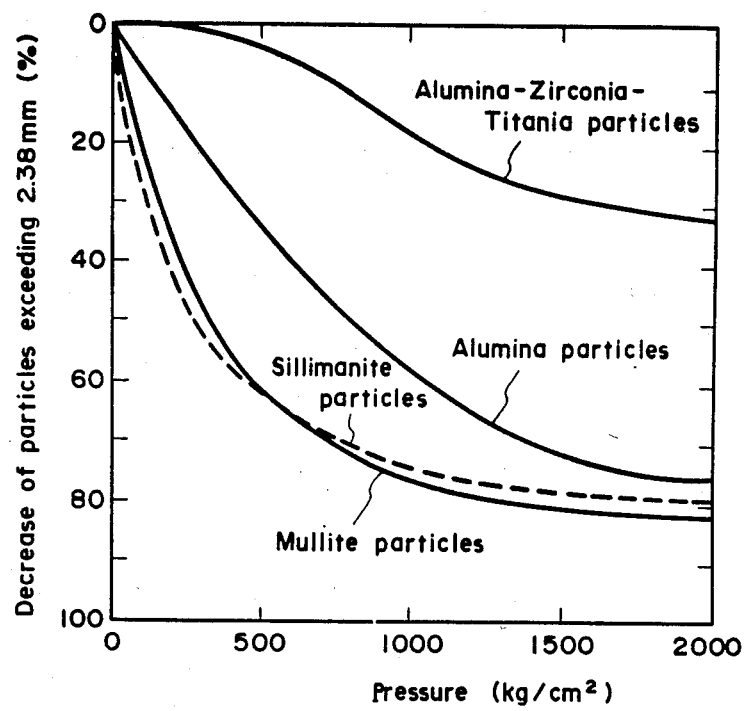
FIG. 3 is a graph showing the compressive strength of a variety of indicated particles. The strength was determined by adjusting 200 g of coarse particles of a given sample in particle size in the range of 3.36 to 2.38 mm, placing the particles in a metal die 40 mm in diameter, compressing them under a fixed magnitude of pressure, examining the particles to find the proportion of coarse particles exceeding 2.38 mm, and calculating the percentage of decrease of such coarse particles. The strength decreases with increasing percentage of decrease of coarse particles.

FIG. 3 compares the electrofused alumina-zirconia-titania mixture consisting of 65.3% by weight of alumina, 31.8% by weight of zirconia, and 2.5% by weight of titania with synthetic raw materials such as sintered alumina and synthetic mullite and natural raw materials such as sillimanite in terms of compressive strength. It is noted from the results shown therein that the alumina-zirconia-titania mixture to be used by the present invention process of is hgher strength than the other raw materials owing to its the characteristic texture.

The particles of the alumina-zirconia-titania mixture to be used by the invention process are only coarse and/or medium particles and are not the fine particles or fine powder.

The coarse and medium particles are not exactly defined by their particle diameter. By the standard of the particles generally used in the composition for the SN plate, the particles may be broadly classified into coarse particles of 4 to 1 mm, medium particles of 1 to 0.3 mm, and fine particles (fine powder) of 0.3 mm or below. Most of the particles which make up the matrix in the texture of the SN plate are fine particles not more than 0.3 mm in size. If fine particles of the alumina-zirconia-titania mixture having high strength are used, the matrix acquires high strength such that when a crack occurs, it propagates along a linear path and tends to induce layer separation in the texture.

When the composition for the SN plate is prepared in accordance with this invention by combining at least one refractory selected from the group of acidic and/or neutral refractory raw materials, carbon, metal powder, and the coarse and medium particles of the alumina-zirconia-titania mixture, the particles of the whole composition are adjusted in a particle size distribution such that coarse and medium particles are to account for a proportion in the range of 30 to 60%, preferably 35 to 55%. Typical acidic refractory raw materials are mullite, mullite-zirconia, and zirconia (CaO stabilized), for example and typical neutral refractory raw materials are alumina and alumina-magnesia spinel, for example. If the proportion of coarse and medium particles in the SN plate is less than 30% by weight, the molded body suffers from the occurrence of lamination during the course of molding and fails to form a plate as desired. If this proportion exceeds 60% by weight, the molded body suffers heavy segregation and the produced SN plate acquires decidedly poor properties.

The alumina-zirconia-titania mixture is contained in the form of coarse and medium particles in the composition as the material for the SN plate in a proportion of 2 to 50% by weight, based on the amount of the composition.

If the proportion is less than 2% by weight, the alumina-zirconia-titania mixture added does not manifest the effect of protecting the SN plate against corrosion and spalling. If the proportion exceeds 50% by weight, the SN plate acquires high strength and high resistance to wear such that the sliding surface of the SN plate after firing suffers loss of grinding efficiency and raises a problem in terms of production.

The coarse and/or medium particles of alumina-zirconia-titania mixture preferably account for a proportion in the range of 10 to 30% by weight based on the amount of the composition.

No particular limitation is imposed on the fine refractory powder which accounts for the remainder of the composition. The source for this fine refractory powder may be at least one member selected from group consisting of metal oxides, metal carbides, metal nitrides, etc. other than alumina-zirconia-titania. Among other members of the group mentioned above, alumina, mullite, sillimanite, mullite-zirconia, etc. prove particularly desirable.

In accordance with the second aspect of this invention, the composition of the SN plate additionally includes low-expansion raw materials such as monoclinic zirconia of not more than 20 μm in size and silicon carbide and silicon nitride both of not more than 150 μm in size for the purpose of imparting volume stability to the SN plate. This inclusion proves particularly desirable for conferring improved resistance to spalling to the SN plate.

If the SN plate happens to contain silica in its composition, this silica reacts with calcium, manganese or oxygen contained in a calcium-added steel, a high manganese steel or a weakly deoxidized steel, for example, to give rise to a low melting substance. When the SN plate is intended for use in the production of such a steel, it is desired to avoid using a raw material containing silica such as mullite, sillimanite or mullite-zirconia for example.

The carbon in the composition enhances the stability of the SN plate to resist corrosion, slag permeation and spalling. Specifically, at least one member selected from the group consisting of natural graphite, artificial graphite, electrode debris, pitch coke, carbon black, etc. is usable for this purpose. In the composition, the proportion of carbon is desired to fall in the range of 1 to 20% by weight.

The metal powder in the composition plays an important role in promoting the firing of the molded body and protecting the aforementioned carbon against oxidation. Concrete examples of the source for this metal powder include aluminum, silicon, chromium, magnesium, titanium, iron, ferrosilicon and ferrochromium. At least one of these metals or alloys thereof is used. Among other metals enumerated above, aluminum and silicon prove to be particularly desirable sources for the metal powder. The amount of the metal powder is desired to fall in the range of 0.5 to 8% by weight based on the amount of the composition.

Optionally, any of the additives such as antioxidants, sintering aids, and fibers which have been heretofore accepted for use in the composition for the SN plate, may be incorporated.

The composition consisting of the components described above is now combined with a binder which is at least one member selected from among tar, pitch, furan resin, phenol resin, etc. The resultant mixture is molded in a prescribed shape with a friction press or an hydraulic press and the molded body is fired in a reducing atmosphere at a temperature of about 1000° to 1500° C.

After the firing, the produced SN plate may be impregnated with pitch, tar or resin and subjected to a baking treatment at a temperature exceeding 200° C. when necessary for the purpose of filling pores occurring within the SN plate with the carbonaceous substance. The sliding surface of the SN plate may be polished when necessary for the purpose improving the smoothness of the surface.

EXAMPLE

Now, working examples of this invention and comparative experiments will be described below.

The refractory raw materials used in these examples and experiments were subjected to chemical analysis and tested for particle compressive strength. The results are shown in Table 1. Of the alumina-zirconia-titania mixtures, those designated as A, D and E have components in proportions outside the range specified by this invention. Table 2 shows the compositions used in the examples and experiments and the results of tests conducted on the produced SN plates with respect to physical properties. In this table Comparative Experiments 1, 2 represent conventional compositions and Comparative Experiments 3–10 represent compositions which deviate from the scope of this invention in terms of chemical analysis of alumina-zirconia-titania mixture, proportion of coarse and medium particles in the composition for the SN plate, proportion of coarse and medium particles in the raw materials for alumina-zirconia-titania mixture.

All the compositions indicated were invariably kneaded with a binder in a 300-kg batch in a mixer. The blends were molded each in a specified SN plate shape 600 mm in length×250 mm in width×50 mm in thickness. The molded bodies were set in place as embedded in coke breeze of a sagger car inside a tunnel kiln and subjected therein to firing at 1400° C. After the firing, the plates were impregnated with pitch and subjected to baking. Further, the sliding surfaces of the plates were polished for improved smoothness.

The spot spalling test was conducted by heating the edge portion of the nozzle orifice of a given SN plate with a gas burner at 1600° to 1650° C.

The sudden heating-cooling spalling test was conducted by placing a sample cube, 50 mm×50 mm×50 mm, cut from a given SN plate in an electric furnace at 1500° C. for 3 minutes, suddenly cooling the hot cube in water and performing this procedure recurrently.

The test for corrosion was conducted by lining a rotary drum with given SN plates, then placing 1 kg of iron piece fused in advance with a gas burner and allowing the SN plates to stand exposed to the fused iron piece at 1650° C. for 5 hours. The results of corrosion are reported as relative values, with those of Comparative Experiment 1, with the heaviest corrosion, taken as 100.

The test for resistance to abrasion was conducted by the sand blasting method, i.e. by exposing a given SN plate to 5 minutes' blasting of fine alumina powder and thereafter measuring the size of the plate lost by abrasion.

It is noted from the test results given in the tables that the SN plates of the working examples of this invention wherein the coarse and medium particles of the alumina-zirconia-titania mixture were in proportions falling within the scope of the invention, stood for a long time before sustaining a crack and that the cracks they finally sustained were minor. These SN plates showed absolutely no sign of layer separation in the sudden heating-cooling spalling test, indicating possession of notably high stability against spalling. It is also noted that these SN plates far excelled those of comparative experiments in terms of resistance to corrosion and resistance to abrasion. Generally, the phenomenon of corrosion which occurs in such refractories as the SN plate consists of the loss caused by chemical corrosion such as of molten steel and the loss caused by physical erosion due to exposure of the coarse particles and the matrix part to abrasion. The notably improved resistance to corrosion which the SN plates of the present invention exhibited may be logically ascribed to the high resistance to corrosion inherently possessed by zirconia in the alumina-zirconia-titania material and to the increased strength the particles themselves acquired.

Then, 10 SN plate sets each of the compositions of Examples 3, 4, 7, and 8 and Comparative Experiments 1 and 2 were severally set in place in a sliding nozzle unit of a 250-ton ladle and used for receiving steel of ordinary grade such as aluminium-killed steel and steel of special grade such as calcium-added steel. The results were as shown in Table 3.

Both in Comparative Experiments 1 and 2, three to five out of 10 SN plate sets were discarded as sustaining chipping of the edge portion of the nozzle orifice and peeling of the sliding surface. Particularly when they were used for receiving calcium-added steel, they suffered aggravated wear of the nozzle orifice by corrosion and heavy surface coarsening and failed to offer any appreciable length of service life.

The SN plates of the working examples of this invention, though suffering from cracks to a minor extent, showed absolutely no sign of chipping of the edge portion of the nozzle orifice or peeling of the sliding surface. The wear of the nozzle orifice suffered in consequence of reception of the calcium-added steel was minor in any of the SN plates of these working examples. Thus, the SN plates of these examples offered a service life about three times as long as that of the SN plates of the comparative experiments.

The edge portions of nozzle orifice sustaining cracks in the SN plates of Comparative Experiment 1 and Example 8 of this invention were sampled and examined under a microscope with respect to the condition of particles in the fractured surface. On the sample of Comparative Experiment 1, the coarse particles in the fractured surface were found to sustain breakage internally as shown in FIG. 4 and cracks propagated along linear paths. In contrast, on the sample of Example 8, the coarse particles in the fractured surface assumed an appearance indicative of grain boundary breakage as shown in FIG. 5 and cracks were found to have propagated along zigzag paths.

As described above, the SN plates of this invention are substantially free from the drawbacks, i.e. chipping of the edge portion of nozzle orifice and peeling of the sliding surface, which are inherent in the SN plates of the conventional technique. Further, they excel in stability to resist wear, spalling, corrosion, and particularly wear of the nozzle orifice and, as the result, enjoy decidedly improved service life.

TABLE 1

Chemical composition of raw material and squeezing pressure (decrease of particles 2.38+ mm in squeezing)

| | | Chemical composition (% by weight) | | | | | | | | | | Squeezing pressure* (500 kg/cm$^2$) Decrease of particles 2.38+ mm (%) |
|---|---|---|---|---|---|---|---|---|---|---|---|---|
| | | Igloss | SiO$_2$ | TiO$_2$ | Al$_2$O$_3$ | Fe$_2$O$_3$ | CaO | MgO | Na$_2$O | ZrO$_2$ | SiC | C | |
| Alumina—zirconia— | A | — | 0.12 | 0.25 | 85.70 | 0.13 | — | — | 0.05 | 13.60 | — | — | 39 |
| titania | B | — | 0.08 | 1.50 | 76.00 | 0.18 | — | — | 0.02 | 21.02 | — | — | 11 |
| | C | — | 0.08 | 2.50 | 65.30 | 0.20 | — | — | 0.02 | 31.80 | — | — | 5 |
| | D | — | 0.07 | 9.50 | 40.90 | 0.12 | — | — | 0.02 | 49.20 | — | — | 55 |
| | E | — | 0.20 | 17.20 | 46.70 | 0.20 | — | — | 0.08 | 35.58 | — | — | 62 |
| Synthetic mullite | | — | 22.44 | 0.14 | 76.11 | 0.30 | — | — | 0.10 | — | — | — | 61 |
| Sintered alumina | | — | 0.05 | — | 99.60 | 0.08 | — | — | 0.01 | — | — | — | 37 |
| Mullite—zirconia | | — | 16.00 | 0.12 | 47.50 | 0.07 | — | — | — | 36.00 | — | — | 58 |
| Alumina—magnesia spinel | | 0.18 | 0.25 | — | 69.62 | 0.05 | 0.42 | 29.85 | — | — | — | — | 35 |
| Zirconia (CaO stabilized) | | 0.13 | — | 0.25 | 0.71 | 0.02 | 4.50 | 0.01 | 0.01 | 94.37 | — | — | 56 |
| Monoclinic zirconia (fine powder) | | 0.04 | 0.60 | 0.25 | 0.12 | 0.27 | — | — | 0.02 | 98.68 | — | — | — |
| Silicon carbide (fine powder) | | — | — | — | — | 0.36 | — | — | — | — | 97.50 | 0.40 | — |

*Determined by placing 200 g of particles 3.36 to 2.38 mm in size in a metal die 40 mm in diameter, subjecting them to compression, and calculating the percentage of decrease of particles exceeding 2.38 mm. The smaller the percentage of decrease of particles 2.38+ mm is, the larger a strength of particle is.

TABLE 2

Examples of the invention and comparative experiments

| | Examples of the invention | | | | | | Comparative Experiment | | | |
|---|---|---|---|---|---|---|---|---|---|---|
| | 1 | 2 | 3 | 4 | 5 | 6 | 7 | 8 | 9 | 10 |
| Proportions (% by weight) | | | | | | | | | | |
| Kind of alumina—zirconia—titania particles | — | — | A | B | B | C | C | C | D | E |
| Proportions of coarse and medium particles in composition (% by wt.) | 50 | 50 | 50 | 25 | 50 | 50 | 60 | 70 | 50 | 50 |
| Coarse particles Alumina—zirconia—titania | | | 20 | 15 | 1 | | 35 | 20 | 20 | 20 |
| (particle size: Alumina | 50 | | 10 | | 29 | | | 25 | 10 | 10 |
| 4 to 1 mm) Mullite | 20 | 10 | | | | 10 | | | | |
| [% by wt.] Mullite zirconia | | 20 | | | | 20 | | | | |
| Medium particles Alumina—zirconia—titania | 20 | 10 | 10 | 10 | 20 | 20 | 20 | 25 | 10 | 5 |
| (particle size: Alumina | 10 | | 10 | | | | 5 | | 10 | 15 |
| 1 to 0.3 mm) Mullite | | 10 | | | | | | | | |
| [% by wt.] Mullite zirconia | | | | | | | | | | |
| Zirconia (CaO stabilized) | | | | | | | | | | |
| Fine particles Alumina—magnesia—spinel | | | | | | 10 | | | | |
| or fine powder Alumina | 40 | 40 | 40 | 57 | 40 | 30 | 30 | 20 | 34 | 34 |
| (particle size: Monoclinic zirconia (20 μm max) | | | | 4 | | | | | | |
| smaller than 0.3 mm) Silicon carbide (150 μm max) | | | | | | | | | 4 | 4 |
| [% by wt.] Silicon nitride (150 μm max) | | | | | | | | | | |
| Pitch coke | 6 | 6 | 6 | 8 | 6 | 6 | 6 | 6 | 6 | 6 |
| Metallic silicon | 4 | 4 | 4 | 6 | 4 | 4 | 4 | 4 | 4 | 4 |
| Phenol resin | (4) | (4) | (4) | (5) | (4) | (4) | (4) | (4) | (4) | (4) |
| Properties of SN plate | | | | | | | | | | |
| Kind of alumina—zirconia—titania particles | — | — | A | B | B | C | C | C | D | E |
| Bulk specific gravity (—) | 2.75 | 2.91 | 2.95 | Molding failed because of occurrence of lamination during molding | 2.91 | 2.85 | 3.24 | 2.92 | Molding failed because of occurrence of crack during firing. | 3.05 |
| Apparent porosity (%) | 9.5 | 9.0 | 10.0 | | 9.8 | 10.0 | 13.0 | 15.6 | | 9.8 |
| Compressive strength (kg/cm²) | 1320 | 1350 | 1330 | | 1500 | 1320 | 2200 | 880 | | 1180 |
| Bending strength (ordinary temperature) (kg/cm²) | 260 | 265 | 250 | | 282 | 245 | 385 | 196 | | 240 |
| Bending strength (1400° C.) (kg/cm²) | 215 | 230 | 205 | | 248 | 205 | 320 | 180 | | 200 |
| Spot spalling test Time before cracking (sec.) | 35 | 65 | 50 | | 45 | 30 | >90 | >90 | | 40 |
| Size of crack | Heavy | Medium | Heavy | | Heavy | Heavy | Minor | Minor | | Heavy |
| Sudden heating-cooling test Number of cycles before cracking | 1 | 3 | 1 | | 2 | 1 | 7 | 7 | | 1 |
| Spalling test (800° C. × 5 min., followed by cooling in water) Number of cycles before peeling | 3 | 5 | 4 | | 3 | 2 | None | None | | 2 |
| Ratio of corrosion by rotary drum corrosion method (data of Comparative Experiment 1 taken as 100) | 100 | 95 | 92 | | 96 | 97 | 86 | 136 | | 112 |
| Wear resistance test (mm) (5 minutes' exposure to sand blasting with fine powder of alumina) | 2.5 | 2.0 | 2.0 | | 2.0 | 2.5 | 0.2 | 5.2 | | 7.5 |
| Workability during grinding of SN plates surface | Good | Good | Good | | Good | Good | Poor workability because of heavy consumption of time in grinding | Separation of coarse particles during grinding owing to segregation. | | |

| | Example | | | | | | | |
|---|---|---|---|---|---|---|---|---|
| | For steel of ordinary grade | | | | | | For steel of special grade | |
| | 1 | 2 | 3 | 4 | 5 | 6 | 7 | 8 | 9 | 10 |

Proportions (% by weight)

TABLE 2-continued

Examples of the invention and comparative experiments

| | | | | | | | | | | | | |
|---|---|---|---|---|---|---|---|---|---|---|---|---|
| Kind of alumina—zirconia—titania-particles | B | B | C | C | C | C | C | C | C | C | C | C |
| Proportions of coarse and medium particles in composition (% by wt.) | | | | | | | | | | | | |
| Coarse particles (particle size: 4 to 1 mm) [% by wt.] | | | | | | | | | | | | |
| Alumina—zirconia—titania | 30 | 50 | 50 | 50 | 60 | 50 | 50 | 50 | 50 | 50 | 50 | 50 |
| Alumina | 10 | 20 | 25 | 30 | 30 | 5 | 20 | 20 | 20 | 20 | 20 | 10 |
| Mullite | 10 | | | | | 25 | 10 | 10 | 10 | 10 | 10 | 20 |
| Medium particles (particle size: 1 to 0.3 mm) [% by wt.] | | | | | | | | | | | | |
| Mullite zirconia | | 10 | 5 | 5 | 5 | | | | | | | |
| Alumina—zirconia—titania | 5 | 10 | 15 | 5 | 15 | 20 | 5 | 5 | 5 | 5 | | |
| Alumina | | 10 | 5 | 10 | 10 | | 15 | 15 | 15 | 15 | 15 | |
| Mullite | 5 | | | | | | | | | | | |
| Mullite zirconia | | | | | | | | | | | | |
| Zirconia (CaO stabilized) | | | | | | | | | | | 5 | 25 |
| Alumina—magnesia—spinel | | | | | | | | | | | | |
| Fine particles or fine powder (particle size: smaller than 0.3 mm) [% by wt.] | | | | | | | | | | | | |
| Alumina | 52 | 40 | 36 | 40 | 22 | 34 | 34 | 34 | 38 | 33 | | |
| Monoclinic zirconia (20 μm max) | 4 | | 4 | | 6 | 4 | 4 | | | | | |
| Silicon carbide (150 μm max) | | | | 6 | | | 6 | 6 | 6 | | | |
| Silicon nitride (150 μm max) | | | | | | 4 | | | | | | |
| Pitch coke | 8 | 6 | 6 | 6 | 6 | 6 | 6 | 6 | 6 | 2 | 8 | |
| Carbon black | 6 | 4 | 4 | 4 | 2 | 2 | 2 | 2 | 2 | 4 | 4 | |
| Metallic silicon | (5) | (4) | (4) | (4) | (4) | (4) | (4) | (4) | (4) | (4) | (4) | (4) |
| Phenol resin | | | | | | | | | | | | |
| Properties of SN plate | | | | | | | | | | | | |
| Kind of alumina—zirconia—titania particles | B | B | C | C | C | C | C | C | C | C | C | C |
| Bulk specific gravity (—) | 2.78 | 2.42 | 2.94 | 2.97 | 3.14 | 2.94 | 3.01 | 3.06 | 3.09 | 2.90 | | |
| Apparent porosity (%) | 12.8 | 8.8 | 8.8 | 8.5 | 11.7 | 10.2 | 9.1 | 9.5 | 10.2 | 10.1 | | |
| Compressive strength (kg/cm²) | 1820 | 1700 | 1720 | 1680 | 1985 | 1620 | 1850 | 1760 | 1630 | 1420 | | |
| Bending strength (ordinary temperature) (kg/cm²) | 296 | 295 | 300 | 291 | 320 | 280 | 304 | 292 | 278 | 268 | | |
| Bending strength (1400° C.) (kg/cm²) | 262 | 275 | 280 | 268 | 305 | 255 | 280 | 268 | 260 | 222 | | |
| Spot spalling test | | | | | | | | | | | | |
| Time before cracking (sec.) | 60 | 60 | >90 | >90 | >90 | >90 | >90 | >90 | >90 | | | |
| Size of crack | Minor | Minor | No crack | No crack | Minor | Minor | No crack | No crack | Minor | Minor | | |
| Sudden heating cooling test Number of cycles before cracking | 5 | 6 | 7 | 7 | 7 | 7 | — | — | 8 | 6 | | |
| Spalling test (800° C. × 5 min, followed by cooling in water) Number of cycles before peeling | 7 | None | — | — | None | None | — | — | None | 8 | | |
| Ratio of corrosion by rotary drum corrosion method (data of Comparative Experiment 1 taken as 100) | 97 | 73 | 68 | 75 | 74 | 84 | 63 | 56 | 72 | 86 | | |
| Wear resistance test (mm) (5 minutes'exposure to sand blasting with fine powder of alumina | 1.5 | 1.0 | 0.8 | 1.0 | 0.5 | 1.2 | 0.8 | 0.6 | 1.0 | 1.5 | | |
| Workability during grinding of SN plates surface | Good | Good | Good | Good | Good | Good | Good | Good | Good | Good | | |

TABLE 3

| | Results of field test | | | | | | | | |
|---|---|---|---|---|---|---|---|---|---|
| | Kind of steel | | | | | | | | |
| | Steel of ordinary grade (aluminum killed steel) | | | | | | Calcium-added steel | | |
| | Comparative Experiment | | Example | | | | Comparative Experiment | Example | |
| | 1 | 2 | 3 | 4 | 7 | 8 | 1 | 7 | 8 |
| Chipping of edge portion of nozzle orifice | 4 sets | 2 sets | 0 set | 0 set | 0 set | 0 set | 3 sets | 0 set | 0 set |
| Peeling of sliding surface | 1 set | 1 set | 0 set | 0 set | 0 set | 0 set | 1 set | 0 set | 0 set |
| Appearance after use | Heavy surface coarsening | Heavy surface coarsening | Slight surface coarsening | Slight surface coarsening | Slight surface coarsening | Slight surface coarsening | Heavy damage of nozzle orifice by fusion | Minor damage of nozzle orifice by fusion | Minor damage of nozzle orifice by fusion |
| Service life (charge) | 3.8 | 4.2 | 5.6 | 5.2 | 5.8 | 5.8 | 1.2 | 3.2 | 3.4 |

What is claimed is:

1. A sliding nozzle plate produced by a process which comprises:
   (a) kneading a composition with a binder,
   (b) molding said kneaded composition into a body having a predetermined shape and
   (c) firing said body in a reducing atmosphere,
   said composition comprising at least one non-alkaline refractory material, carbon, metal powder and 2 to 50% by weight of a mixture of coarse, medium or both coarse and medium sized particles of alumina, zirconia and titania, said mixture comprising 42 to 79.3% by weight of alumina, 20 to 40% by weight of zirconia, 0.5 to 16% by weight of titania and up to a total of 2% by weight of $SiO_2$, $Fe_2O_3$ and $Na_2O$, based on the total weight of said mixture, 30 to 60% of the total weight of said composition being of coarse and medium-sized particles, with the balance being fine powder.

2. The sliding nozzle plate according to claim 1 wherein said composition has a particle size distribution of 35 to 55% by weight of coarse and medium particles with the balance being fine powder.

3. The sliding nozzle plate according to claim 2 wherein said alumina-zirconia-titania mixture is present at 10 to 30% by weight.

4. The sliding nozzle plate accordng to claim 1 wherein said alumina-zirconia-titania mixture is present at 10 to 30% by weight.

5. A sliding nozzle plate produced by a process which comprises:
   (a) kneading said coposition with a binder,
   (b) molding said kneaded composition into a body having a predetermined shape and
   (c) firing said body in a reducing atmosphere,
   said composition comprising at least one non-alkaline refractory material, carbon, metal powder, at least one material selected from the group consisting of monoclinic zirconia having a particle size up to 20 microns, silicon carbide having a particle size up to 150 microns and silicon nitride having a particle size up to 150 microns, and 2 to 50% by weight of a mixture of coarse, medium or both coarse and medium particles of alumina, zirconia and titania, said mixture comprising 42 to 79.3% by weight of alumina, 20 to 40% by weight of zirconia, 0.5 to 16% by weight of titania and up to a total of 2% by weight of $SiO_2$, $Fe_2O_3$ and $Na_2O$, based on the total weight of said mixture, 30 to 60% of the total weight of said composition being of coarse and medium-sized particles, with the balance being fine powder.

6. The sliding nozzle plate according to claim 5 wherein said composition has a particle size distribution of 35 to 55% by weight of coarse and medium particles with the balance being fine powder.

7. The sliding nozzle plate according to claim 6 wherein said alumina-zirconia-titania mixture is present at 10 to 30% by weight.

8. The sliding nozzle plate according to claim 5 wherein said alumina-zirconia-titania mixture is present at 10 to 30% by weight.

* * * * *